United States Patent [19]

Carrock et al.

[11] 3,887,652

[45] June 3, 1975

[54] PROCESS FOR PRODUCING TRANSPARENT GRAFT POLYMER COMPOSITIONS

[75] Inventors: Frederick E. Carrock, Paramus; Frank K. Y. Chu, Ramsey, both of N.J.

[73] Assignee: Dart Industries Inc., Los Angeles, Calif.

[22] Filed: May 10, 1973

[21] Appl. No.: 359,175

Related U.S. Application Data

[63] Continuation-in-part of Ser. No. 88,216, Nov. 9, 1970, abandoned.

[52] U.S. Cl.. 260/880 R; 260/29.7 UP; 260/47 UA; 260/876 R
[51] Int. Cl. ............................................. C08f 19/08
[58] Field of Search ................................ 260/880 R

[56] References Cited
UNITED STATES PATENTS

| | | | |
|---|---|---|---|
| 3,178,489 | 4/1965 | Lunk et al. | 260/880 |
| 3,370,105 | 2/1968 | DeBell et al. | 260/880 |
| 3,436,440 | 4/1969 | Abe et al. | 260/880 |

FOREIGN PATENTS OR APPLICATIONS

| | | | |
|---|---|---|---|
| 873,948 | 8/1961 | United Kingdom | 260/880 R |

Primary Examiner—John C. Bleutge
Attorney, Agent, or Firm—Fred S. Valles; Margareta LeMaire

[57] ABSTRACT

A process has been developed to produce a transparent graft polymer composition directly in bead form from a butadiene based rubber latex, styrene and methyl methacrylate using a combination of emulsion and suspension polymerization steps.

10 Claims, No Drawings

PROCESS FOR PRODUCING TRANSPARENT GRAFT POLYMER COMPOSITIONS

This application is a continuation-in-part of Ser. No. 88,216, filed Nov. 9, 1970, now abandoned.

This invention relates to a process for preparing transparent graft polymer compositions having good impact properties from a butadiene based rubber latex and a mixture of styrene and methyl methacrylate monomers.

Heretofore, graft polymer compositions have been prepared using a variety of processes such as mass or bulk polymerization, mass polymerization in combination with suspension polymerization, suspension polymerization alone, and emulsion polymerization alone. All of these processes suffer from certain drawbacks or limitations with respect to processing or final product.

For example, in the mass polymerization or the combined mass and suspension polymerization the rubber material is usually dissolved in the monomers followed by complete or partial polymerization depending on which technique is followed. The description in U.S. Pat. No. 3,267,178 is exemplary of these types of processes. Unfortunately, the amount of rubber one can dissolve in the monomers without creating unduly high viscosities is relatively small and thus limits the ultimate impact properties that can be achieved in the final product. In addition, the particle size of the grafted rubber component in the resulting product is relatively large, e.g. up to 10 microns with the average size normally in the range of 1 to 4 microns, which is undesirable with respect to transparency.

Suspension polymerizations generally involve suspending the rubber material and monomers in an aqueous medium followed by polymeization. The rubber material is suspended either by dissolving the rubber in the monomers and dispersing the solution in the aqueous medium or by converting a rubber latex to a suspension by controlled partial coagulation. With the former technique a problem arises in that unless the rubber concentration in the monomers is extremely low, the viscosity of the solution is so high that dispersion is difficult. This technique also produces a relatively large particle size grafted rubber component in the resulting product.

As for employing a rubber latex and converting this to a suspension there is again extreme difficulty in controlling particle size. while the initial rubber particles in the latex are of a desirable size they become swollen and coalesce into larger particles after being suspended and the monomers have been added. This procedure is described in U.S. Pat. No. 3,370,105.

Emulsion polymerization involves direct addition of the monomers to the rubber latex followed by polymerization. Although this process provides certain advantages relative to the above described processes with respect to the desired particle size and the total rubber content that may be achieved in the final product there are certain disadvantages due to the inherent nature of emulsions and the manner in which the product must be recovered. In particular, since the product is produced in emulsion recovery must involve coagulation, spray-drying, or some other time-consuming and costly procedure, which do not readily permit the removal of emulsifying constituents. As a result, these constituents turn up as undesirable impurities in the product. Processes of this type are described in U.S. 2,943,079, U.S. 3,300,545 and U.S. 3,261,887 as well as the aforementioned U.S. 3,370,105.

In accordance with the process of this invention a transparent graft polymer composition having good impact properties is produced with a minimum of the disadvantages outlined with respect to the processes described above. Briefly, the process involves two stages which may be carried out sequentially in separate reactors or in a single reactor. In the first stage, a butadiene based rubber latex is introduced to a reaction zone along with styrene and methyl methacrylate monomers and a free radical initiator. The emulsion is then subjected to polymerization conditions to produce a pregraft reaction product which is still in emulsion. The second stage of the process is then commenced wherein the emulsion of pregraft reaction product together with additional styrene and methyl methacrylate monomers and a free radical initiator are mixed in an aqueous media containing a suspending agent. The sequence of addition of these ingredients is not critical. The mixture is then heated up to the polymerization conditions of the second stage polymerization during which time the emulsion of pregraft reaction product is substantially converted to a suspension joining the remaining ingredients in suspension. The resulting graft polymer composition is obtained from the suspension polymerization as free-flowing beads which are easily recovered by simple filtration. Water soluble impurities may be removed by washing since they predominately appear at the surface of the beads.

More specifically considering the first stage, which is sometimes referred to as a prepolymerization step, the butadiene based rubber latex is an emulsion polymerized elastomeric polymer of butadiene with 0 to 40 percent by weight styrene in a latex form. These latices are well known and commercially available generally containing 30 to 65 percent solids and wherein the rubber particles have an average particle size in the range of 0.01 to 0.8 micron, preferably 0.05 to 0.2 micron. It should be understood that the solids content of the latex is not critical but is merely dependent upon what may be conveniently handled by the available equipment. In some instances it may be desirable to thin out the latex with additional water still maintaining the emulsion form.

In the first stage the above described butadiene based rubber latex together with styrene and methyl methacrylate monomers are charged to the reaction zone along with a free radical initiator. In charging the materials to the reaction zone the monomers may be added all at once to the latex or, alternatively, they may be added incrementally or continuously during the first stage. The term "mixture of monomers" and similar terms referring to "mixture" employed hereinafter are not to be construed as meaning that the monomers need to be physically mixed prior to the introduction to the reaction zones. In effect, the monomers are suitably added to any of the reaction zones as separate streams. The weight ratio of styrene to methyl methacrylate is not too critical but is usually in the range of 5/95 to 80/20 and preferably 15/85 to 75/25. The weight ratio of the total monomers to rubber solids in the first stage should be in the range of 5/95 to 60/40, preferably 15/85 to 50/50.

The initiator or initiator system employed in the first stage may be any of those well known and typically used in emulsion polymerization. By way of example, conventional peroxy and perazo catalysts, preferably of a water soluble type such as potassium persulfate and ammonium persulfate, may be used. Oil soluble initiators may also be used such as hydroperoxides, e.g. t-butyl hydroperoxide or cumene hydroperoxide. If desired, the initiators may be activated to form redox systems. The use of reducing agent in these systems may be accompanied by a chelating agent to give a balanced generation of free radicals. Actinic radiation may also be used.

In addition to the above-mentioned ingredients a chain transfer agent, such as t-dodecyl mercaptan, may optionally be employed in an amount up to 0.5 percent by weight based on the total monomers charged during the first stage.

The first stage polymerization, or prepolymerization, is generally carried out at temperatures in the range of 15°C to 80°C, preferably 50°C to 75°C, until substantially all of the monomers have polymerized. This will normally be accomplished within one to four hours but can vary outside this time range depending on the equipment, the amount of initiator, and the temperature, etc.

It should be understood that during the first stage polymerization both grafting and crosslinking occur to such an extent that the initial particle size of the rubber is fixed. That is, the initial particle size of the rubber is not appreciably altered by the grafting and crosslinking but the effect is to render the pregrafted and crosslinked material substantially insoluble and resistant to swelling with respect to the additional monomers which are combined with the pregraft reaction product in the second stage suspension polymerization. Since the initial particle size of the rubber is not appreciably altered by the grafting and crosslinking, which occurs in both the first and second stages, the particle size of the grafted and cross-linked material in the final product is essentially the same as the initial particle size of the rubber.

After completion of the first stage polymerization, the emulsion of pregraft reaction product is mixed with an aqueous media containing a suspending agent along with additional styrene and methyl methacrylate monomers and a free radical initiator. All of this may be accomplished in the same reaction vessel, thus avoiding the necessity for transfer of the emulsion, or a separate vessel may be employed. Preferably these ingredients are combined at or near room temperature but any temperature below that at which significant polymerization begins would be satisfactory (e.g. 70°–80°C). In any event, after the ingredients have been mixed the mixture is heated up to the desired polymerization conditions during which time the emulsion of pregraft reaction product is substantially converted to a true suspension.

The amount of water employed in the mixture for conducting the second stage polymerization may vary over wide limits. A minimum amount must be present to provide for suspension stability and adequate heat transfer. This, of course, will vary depending on the total reactants charged, the equipment, polymerization conditions, etc. The upper limit will primarily be governed by practical considerations of material handling. Satisfactory results have been obtained with weight ratios of water to total pregrafted reaction product and monomers in the range of 1/1 to 4/1, however other ratios may also be used. This may be easily determined by one skilled in the art without undue experimentation upon considering the various aspects of a particular polymerization.

The quantity of styrene and methyl methacrylate monomers added should be such that the total styrene-methyl methacrylate content of the final product is in the range of 40 to 97 percent by weight, preferably 50 to 95 percent by weight. This, of course, means that the butadiene based rubber content in the final product is in the range of 3 to 60 percent by weight, preferably 5 to 50 percent by weight. The concentration of styrene in the monomer mixture added for the second stage polymerization depends upon the styrene concentration of the monomer mixture used in the first stage polymerization and the amount of bound styrene in the butadiene based rubber. It is essential in order to obtain a transparent product that the concentration of styrene in the graft, i.e. the percent by weight of total styrene ($S_a$) added basis the total monomers added to the first and second polymerization is within the limits set by the following relationship, where $S_a$ is defined as above and $S_b$ stands for weight percent bound styrene in the butadiene based rubber:

$$wt\% S_a = 23.4 + 0.766 (S_b) \pm 10$$

Thus, for a polybutadiene based rubber with 0 percent bound styrene the total concentration of styrene should range between 13.4 and 33.4 percent by weight basis the total amount of monomers added. Similarly, in the case of a rubber containing 40 percent of bound styrene the concentration of styrene in the total monomer mixture should be between 44 and 64 weight percent.

When the butadiene based rubber contains particles of relatively large average particle size, a narrower range should be employed, e.g. the styrene concentration should be limited according to the relationship $$wt\% S_a = 23.4 + 0.766(S_b) \pm 5$$

when the particle size is larger than 0.2 micron.

The suspending agent may be any of a variety of water soluble dispersing agents known in the art. Included are alkali salts of sulfonated polystyrene or polyvinyltoluene, bentonite, polyacrylic acid, talc, polyacrylamide, methylcellulose, hydroxyethyl cellulose, tricalcium phosphate, polyvinyl alcohol, water soluble interpolymers of acrylic acid or methacrylic acid and 2-methylhexyl-methacrylate, carboxymethyl cellulose, or carboxymethyl methyl cellulose and alkali metal salts thereof. The amounts of suspending agent that can be used will vary with preferred amounts being in the range of about 0.2% to 5% by weight based on the water present.

The free radical initiators which are useful in the second stage polymerization are known in the art. Preferably, these initiators are conventional monomer-soluble peroxy or perazo compounds. Included are t-butyl perbenzoate, di-t-butyl peroxide, dibenzoyl peroxide, benzoyl peroxide, t-butyl peracetate, t-butyl peroxy isopropyl carbonate, lauroyl peroxide, oleyl peroxide, toluyl peroxide, azo-bis-isobutyronitrile, di-cumyl peroxide, acetyl peroxide, cumene hydroperoxide, t-butyl hydroperoxide, di-t-butyl diperphthalate, cyclopentane hydroperoxide, pinane hydroperoxide, and mixtures thereof. It should be understood that these specifically mentioned initiators are only by way of example and others may be also employed.

Other additives may also be optionally employed in the second stage polymerization such as antioxidants, e.g. tri(nonylphenyl) phosphites, butylated hydroxy toluene and other well known phenolic antioxidants; surface active agents to assist the suspending agents, e.g. sodium propyl phosphate and alkyl aryl sulfonates; and chain transfer agents for controlling molecular weight build-up and cross-linking between the rubber molecules. A suitable chain transfer agent is t-dodecyl mercaptan which can be employed in amounts up to about 1.5 percent by weight based on the total monomers and grafted reaction product present in the system, preferably 0.2 to 0.8 percent by weight.

Another additive found to be useful during the second stage suspension polymerization is a compound selected from the group consisting of ethylenediamine tetraacetic acid, methylene disalicylic acid, salicylic acid, citric acid, tartaric acid, ascorbic acid, phosphoric acid and partial alkali metal salts thereof containing at least one free carboxylic acid group per molecule, e.g. trisodium salt of ethylenediamine tetraacetic acid. Additives of this type have been found to have a beneficial influence on melt flow of the final product when used in quantities of 0.025 to 5 percent by weight based on the reactants. While it is uncertain as to the precise mechanism that leads to this result it is theorized that the additive may interfere with the interaction that may tend to take place between the mercaptan chain regulating agent and the initiator thus indirectly having an influence on the melt flow of the product.

The second stage polymerization is generally carried out at temperatures in the range of about 80°C to about 150°C, preferably 90°C to 145°C. It is sometimes desirable to begin at a lower temperature and step-wise increase the temperature periodically until polymerization is essentially complete. The precise temperatures and time intervals between temperature increases will primarily depend upon the initiator system and quantity of initiator employed and can readily be determined by one skilled in the art.

After polymerization is essentially complete the graft polymer composition product is easily separated from the suspension by simple filtration as the product is in the form of discrete beads. Water soluble impurities from the suspension polymerization on the surface of the beads may be removed by additional washing with water.

While the invention has been described above in connection with styrene and methyl methacrylate as the monomers employed it is pointed out that minor amounts of an additional monomer may be added in either the first or second stages, or both, to modify certain physical properties of the graft polymer composition such as heat distortion, stiffness, hardness and chemical resistance. Examples of some of these additional monomer modifiers include acrylonitrile, alpha-methylstyrene, ethyl acrylate, butyl acrylate, methacrylonitrile, and the like. These monomers are added in a minor amount to the extent that the basic characteristics of this invention are not affected.

The following examples are illustrative of the process of this invention:

EXAMPLE 1

A number of graft polymer compositions employing a polybutadiene latex were prepared using the procedure set forth below. In the experiments the styrene contents of the monomer mixture to the first and the second stage polymerization were varied as well as the styrene content of the total amount of monomers added to both steps. Also, the amount of t-dodecyl mercaptan chain regulator in the second stage was varied; all of which is indicated in the following Table A, wherein each composition is listed along with its corresponding physical properties. The transparency of the test specimens was determined by visual observation, Izod impact strength by ASTM method D-256, (two 1/8" bars × 1/2" × 2 1/2", notched) and Rockwell hardness "R" by ASTM method D-785.

In the first stage, a polybutadiene latex having 45 percent solids content wherein the rubber had an average particle size of about 0.1 micron was charged to a 2-liter stirred glass bowl reactor in an amount equivalent to 80 parts by weight rubber solids and the system was closed. Thereafter, 20 parts by weight of a monomer mixture of styrene and methyl methacrylate and 0.04 parts by weight of t-dodecyl mercaptan were metered into the reactor with mild agitation and was thoroughly mixed for about thirty minutes. At this point about 0.2 parts by weight of ammonium persulfate dissolved in a small amount of deionized water was added to the reactor. After evacuating the reactor and purging with nitrogen the emulsion was gently heated to about 65°C and maintained at that temperature for about 1½ hours with stirring when essentially all of the monomers had become polymerized. The pregraft reaction product in emulsion was then cooled for use in the second stage.

Using a portion of the pregraft reaction product in emulsion the second stage was run to produce approximately 300g of dry graft polymer composition having a rubber content of about 18 wt percent. This procedure involved charging a 2-liter stirred glass bowl reactor with 600 gm deionized water, 3 gm hydroxyethylcellulose suspending agent and 1.2 gm of the trisodium salt of ethylenediamine tetraacetic acid. After closing the reactor about 232.5 gm of a mixture of styrene and methyl methacrylate, 0.6 gm tri(nonylphenyl) phosphite as a stabilizer, 0.45 ml t-butyl perbenzoate and 0.09 ml di-t-butyl peroxide as initiators, and t-dodecyl mercaptan as a chain transfer agent were slowly added to the suspension with agitation. The reactor was then purged with nitrogen and gently heated to 70°C after which about 67.5 gm of the pregrafted reaction product solids in aqueous emulsion (166 gm total), from the first stage polymerization were added with stirring. Under continuous stirring the contents of the reactor were heated to about 100°C, during which time the emulsion of pregrafted reaction product was substantially converted to a suspension, and the polymerization cycle was begun by maintaining the 100°C temperature for about 1 hour, thereafter increasing the temperature to 105°C and maintaining that level for about 3 hours, then raising the temperature to about 115°C and maintaining that level for about 1 hour, and finishing off the polymerization by raising the temperature to about 130°C and holding it there for about one hour. At the end of this cycle polymerization was essentially complete and the graft polymer composition product was formed as discrete beads in the suspension. The beads were recovered by filtration and washed with water followed by vacuum drying at 65°C for about 16 hours. In order to evaluate the physical properties of the product the beads were milled into a sheet, diced, ground into fine particles and molded into standard bars and discs at 232°C–246°C for use as test specimens. The transparency of each of the compositions were determined by visual observation of injection molded discs having a thickness of about ⅛ inch. The discs were placed on a typewritten sheet of paper and the transparency was rated as follows:

Very good: Completely transparent and free of haze.
Good: Completely transparent but with slight haze.
Poor: Definitely hazy, but type is readable through disc.
Very poor: Translucent, type is perceptible but cannot be read through disc.

CONTROL EXAMPLE 3

Using the procedure set forth below wherein the rubber employed was a styrene-butadiene copolymer rubber (SBR) having a nominal bound styrene content of 29 weight percent and an average particle size of about 0.25 micron, a composition was made at conditions outside the limits of the invention, i.e. the concentration of styrene in the total monomer mixture of 26.4 weight percent was outside the limits of 45.6 ± 10 weight percent.

In the first stage, the latex was adjusted with deionized water to a 44 percent solids content. 80 parts by weight of the latex (solids) were charged to a 2-liter stirred glass bowl reactor and the system was closed. Thereafter, 20 parts by weight of a monomer mixture of styrene and methylmethacrylate (50/50 weight ratio) and 0.04 part by weight t-dodecyl mercaptan were slowly added to the emulsion in two separate increments with mild agitation and the total charge was thoroughly mixed for about thirty minutes. A small amount of anionic soap and potassium hydroxide were added to adjust the pH and stabilize the emulsion. Then about 0.12 part by weight of ammonium persulfate dissolved

TABLE A

| Product Composition | | Weight Percent Styrene In Monomers | | | Chain Regulator (gm) | Melt Flow (gm/10min.) | Izod Impact (ft-lb) | Rockwell Hardness "R" | Transparency |
|---|---|---|---|---|---|---|---|---|---|
| | | First Stage | Second Stage | Total | | | | | |
| Control | A | 50 | 50 | 50 | 0.75 | 1.9 | 3.4 | 86.3 | Very Poor |
| Control | B | 50 | 50 | 50 | 1.5 | 6.6 | 0.3 | 84.9 | Very Poor |
| Control | C | 35 | 35 | 35 | 0.75 | 0.4 | 1.7 | 95.6 | Poor |
| Control | D | 35 | 35 | 35 | 1.5 | 1.9 | 1.5 | 94.0 | Poor |
| Control | E | 35 | 35 | 35 | 0.75 | 1.2 | 0.4 | 101.0 | Poor |
| Control | F | 35 | 35 | 35 | 1.5 | 12.6 | 0.3 | 101.5 | Poor |
| | G | 50 | 25 | 26.4 | 1.5 | 0.8 | 2.8 | 90.4 | Very Good |
| | H | 50 | 25 | 26.4 | 1.5 | 0.5 | 1.5 | 94.0 | Very Good |
| | I | 50 | 25 | 26.4 | 2.25 | 1.8 | 0.6 | 89.5 | Very Good |
| | J | 50 | 25 | 26.4 | 2.25 | 1.5 | 0.9 | 90.1 | Very Good |
| | K | 35 | 25 | 25.5 | 0.75 | 0.1 | 1.8 | 93.6 | Very Good |
| | L | 35 | 25 | 25.5 | 1.50 | 0.5 | 1.9 | 95.0 | Very Good |
| | M | 35 | 25 | 25.5 | 1.50 | 0.4 | 0.9 | 94.0 | Very Good |
| | N | 35 | 25 | 25.5 | 1.50 | 1.1 | 1.4 | 94.4 | Very Good |
| | O | 35 | 25 | 25.5 | 2.25 | 0.5 | 1.3 | 91.6 | Very Good |
| | P | 35 | 25 | 25.5 | 2.25 | 2.0 | 0.3 | 93.3 | Very Good |
| | Q | 25 | 25 | 25 | 0.75 | 0.3 | 2.4 | 97.0 | Very Good |
| | R | 25 | 25 | 25 | 1.50 | 1.0 | 2.3 | 96.0 | Very Good |
| | S | 25 | 25 | 25 | 1.50 | 1.6 | 0.5 | 97.0 | Very Good |
| | T | 25 | 25 | 25 | 2.25 | 2.1 | 0.4 | 94.4 | Very Good |

NOTE:
Product Composition A–D and G–T had a total of 18% by weight rubber content and the amount of chain regulator employed in the second stage was based on a charge of 232.5 gm monomers and 67.5 gm pregraft reaction product solids.
Product Composition E–F had a total of 12% by weight rubber content and the amount of chain regulator employed in the second stage was based on a charge of 255 gm monomers and 45 gm pregraft reaction product solids.

EXAMPLE 2

Using the procedure of Example 1 except that the rubber employed was a polybutadiene rubber of larger average particle size (0.25 micron) a number of transparent graft polymer compositions containing 18% rubber were prepared, the pertinent data being reported in Table B. Comparisons of the data from this example with those of compositions G-P of Example 1 demonstrate the effect of rubber particle size on transparency i.e. an increase in particle size from 0.1 to 0.25 micron changes the transparency rating from "very good" to "good."

TABLE B

| Product Composition | Weight Percent Styrene In Monomers | | | Chain Regulator (gm) | Melt Flow (gm/10min.) | Izod Impact (ft-lb) | Rockwell Hardness "R" | Transparency |
|---|---|---|---|---|---|---|---|---|
| | First Stage | Second Stage | Total | | | | | |
| A | 50 | 25 | 26.4 | 1.50 | 0.7 | 2.6 | 100.4 | Good |
| B | 50 | 25 | 26.4 | 1.50 | 2.4 | 2.0 | 103.9 | Good |
| C | 50 | 25 | 26.4 | 2.25 | 7.2 | 0.5 | 100.8 | Good |
| D | 50 | 25 | 26.4 | 2.25 | 7.9 | 0.5 | 102.6 | Good |
| E | 35 | 25 | 25.5 | 0.90 | 0.8 | 2.6 | 103 | Good |
| F | 35 | 25 | 25.5 | 1.50 | 3.4 | 1.5 | 101.8 | Good |

NOTE:
The amount of chain regulator employed in the second stage was based on a charge of 232.5 gm monomers and 67.5 gm pregraft reaction product solids.

in a small amount of deionized water was added to the reactor. After evacuating the reactor and purging with nitrogen the emulsion was gently heated to about 65°C and maintained at that temperature for about four hours with stirring when essentially complete polymerization had been achieved. The pregraft reaction product in emulsion was then cooled for use in the second stage.

In the second stage of the process a 2-liter stirred glass bowl reactor was charged with 600 gm deionized water, 3 gm hydroxyethyl cellulose suspending agent and 1.2 gm of the trisodium salt of ethylenediamine tetracetic acid. After closing the reactor about 232.5 gm of a 25/75 weight ratio mixture of styrene and methyl methacrylate, 0.75 gm tri (nonylphenyl) phosphite as a stabilizer, 0.45 ml of t-butyl perbenzoate and 0.09 ml of di-t-butyl peroxide as initiators, and 1.5 gm t-dodecyl mercaptan as a chain regulator were slowly added to the suspension with agitation. The reactor was then purged with nitrogen and gently heated to 70°C after which about 67.5 gm of the pregrafted reaction product solids in aqueous emulsion (192.5 gm emulsion) from the first stage were added with stirring. Under continuous stirring the contents of the reactor were heated to about 100°C, during which time the emulsion of pregraft reaction product was substantially converted to a suspension, and the polymerization cycle was begun and completed according to the following schedule:

| 100°C | — | 1 hour |
|---|---|---|
| 105°C | — | 2 hours |
| 115°C | — | 1 hour |
| 130°C | — | ½ hour |

At the end of the cycle polymerization was essentially complete and the graft composition product having about 18 wt percent rubber content was formed as discrete beads in the suspension. The beads were recovered, washed, dried and evaluated in the same manner outlined in Example 1. The composition was found to have a transparency rating of "very poor", a melt flow at 230°C of 4.1 gm/10 min., an Izod impact of 1.0 ft-lb and a Rockwell hardness "R" of 105.6.

EXAMPLE 4

A transparent graft polymer composition having 47 percent rubber content suitable for melt blending with polyvinyl chloride resins was prepared in accordance with this process.

In the first stage, a styrene-butadiene copolymer rubber latex (nominal 29 percent styrene) having an average particle size of about 0.1 micron and a monomer mixture of styrene and methyl methacrylate (50/50 weight ratio) were polymerized in the same manner as described in the first stage polymerization of Example 3.

In the second stage, a 2-liter glass bowl reactor was charged with 125 g of a monomer mixture of styrene and methyl methacrylate (42/58 weight ratio, resulting in a styrene concentration in total monomers added to both stages of 43.8 wt percent), about 0.75 gm tri (nonylphenyl) phosphite, about 0.6 gm of t-dodecyl mercaptan, an initiator system comprising about 0.45 gm t-butyl perbenzoate and about 0.075 gm of di-t-butyl peroxide, and sufficient deionized water to result in a total suspension wherein the water to polymer ratio was about 3/1. Small amounts of the trisodium salt of EDTA and hydroxyethyl cellulose were also included. A portion of the above mentioned pregraft reaction product (475 gm of a 40 percent solids emulsion) was added to the suspension at about 70°C and the mixture was heated to 100°C during which time the emulsion of pregraft reaction product was converted to a suspension. A polymerization cycle similar to that described in Example 3 was employed and the product composition was formed and recovered as discrete beads. The composition was molded into discs, which had a "very good" transparency rating. The beads from a duplicate run except that the styrene-butadiene copolymer latex had an average particle size of about 0.25 micron were melt blended with polyvinyl chloride (17.5 parts to 100 parts, 3 parts by weight low molecular weight polymethyl methacrylate as a processing aid, 3 parts by weight of a stabilizer and 1.5 parts by weight glyceryl tristearate as a lubricant. The resulting blend had a "good" transparency rating.

EXAMPLE 5

Two experiments were made to demonstrate the necessity of carrying out the reactions in two separate steps with separate monomer additions. Both experiments were carried out under conditions to yield products having the same amounts of styrene and methyl methacrylate grafted onto the rubber (polybutadiene), i.e. the products contained 30% rubber and the concentration of styrene in the total monomer mixtures were maintained at 25 weight percent.

In the first experiment the prepolymerization was carried out by charging 675 gms of a polybutadiene latex (rubber content 40 percent, average particle size 0.1 micron), 256.5 gms of a mixture of 25 weight percent styrene in methyl methacrylate, 1.28 gms each of potassium persulfate and t-dodecyl mercaptan and 461.8 gms of deionized water. A small amount of anionic soap and potassium hydroxide were added to adjust the pH and stabilize the emulsion. Polymerization was carried out at 65°C for 2 1/2 hours.

In the second stage, a 2-liter glass bowl reactor was charged with a solution of 3 gms of hydroxyethyl cellulose and 1.2 gms of EDTANa$_3$, 124.5 gms of a monomer mixture (25 weight percent styrene in methyl methacrylate) well mixed with 0.31 gm of benzoyl peroxide, 1.5 gms of t-dodecyl mercaptan and 0.6 gms of tri(nonylphenyl) phosphite. The reactor was purged with nitrogen while stirring. The reactor content was slowly heated up to 70°C while stirring and 470 gms of the prepolymer from the first step was gradually added to the reactor. The temperature was increased to 80°C and suspension polymerization was carried out at this temperature for 5 hours until completion. A fine powder product was recovered, washed repeatedly and dried. Molded specimens of the product had an excellent transparency.

In the control experiment, a mixture of 450 gms deionized water, 2.25 gms of hydroxyethyl cellulose, 0.9 gms of EDTANa$_3$ and 1.05 gms of potassium persulfate was prepared and stirred until the ingredients were completely dissolved. The mixture was then added to a 2-liter glass bowl reactor, which was then charged with 225 gms of polybutadiene latex (40 percent rubber) and a mixture of 52.5 gms of styrene, 157.5 gms of methyl methacrylate, 0.522 gms of benzoyl peroxide, 0.6 gms of tri (nonylphenyl) phosphite and 1.5 gms of t-dodecyl mercaptan. The reactor was purged with nitrogen while stirring. The reactor content was heated to 75°C and polymerized while stirring at this temperature. Extreme difficulties were encountered in assessing the degree of polymerization with time by solids determination and after 1 hour the reactor contents were converted to a suspension by the addition of 450 gms deionized water containing 2.25 gms of hydroxyethyl cellulose. The temperature was raised to 80°C and suspension polymerization was carried out for 4 hours at 80°C until completion. The product which was in fine powder form was recovered by filtration and washed repeatedly with water and dried. Molded test specimens showed the product to have non-uniform transparency and therefore not being commercially acceptable.

Thus having described the invention in detail, it will be understood by those skilled in the art that certain variations and modifications may be made without departing from the spirit and scope of the invention as described herein and in the appended claims.

What is claimed is:

1. A process for preparing a transparent graft polymer composition comprising:
   a. preparing a pregraft reaction product in emulsion and in the absence of added suspending agent by reacting a butadiene based rubber latex containing from 0 to 40% by weight of bound styrene ($S_b$) and having an average rubber particle size in the range of 0.01 to 0.8 micron with a first monomer mixture of styrene and methyl methacrylate having a weight ratio in the range of 5/95 to 80/20, the weight ratio of total monomers to total rubber solids being in the range of 5/95 to 60/40 under conditions such that essentially all of the monomer mixture is reacted, employing solely a water soluble emulsion polymerization catalyst in said preparation;
   b. forming an aqueous suspension of a second monomer mixture of styrene and methyl methacrylate, the emulsion of pregraft reaction product from step (a) and an oil soluble initiator, the amount of emulsion being sufficient to provide a total rubber content in the final graft polymer composition in the range of 3 to 60 percent by weight and the weight ratio of styrene to methyl methacrylate in the second monomer mixture being such that the concentration of total styrene ($S_a$) basis the total amount of styrene and methyl methacrylate in the first and second monomer mixture is within the limits defined by the relationship wt%$S_a$ = 23.4 + 0.766($S_b$)±10.
   c. increasing the temperature of the suspension containing the emulsion of pregraft reaction product to an initial polymerization temperature in the range of 80°C to 150°C during which time the emulsion is substantially converted to a suspension;
   d. polymerizing the monomers in the presence of the pregraft reaction product in suspension at temperatures in the range of 80°C to 150°C; and
   e. recovering the graft polymer composition product in bead form directly from suspension.

2. A process according to claim 1 wherein the butadiene based rubber latex is polybutadiene.

3. A process according to claim 1 wherein the butadiene based rubber latex is an elastomeric polymer of butadiene with 20 to 35 percent by weight styrene.

4. A process according to claim 1 wherein the butadiene based rubber latex has an average rubber particle size in the range of 0.05 to 0.2 micron.

5. A process according to claim 1 wherein the butadiene based rubber latex has an average rubber particle size which is larger than 0.2 micron and the concentration of total styrene $S_a$ is maintained whithin the limits defined by the relationship $$\text{wt\% } S_a = 23.4 + 0.766(S_b) \pm 5.$$

6. A process according to claim 1 wherein a chain regulating agent is employed in step (a) or step (b) or both steps (a) and (b).

7. A process according to claim 1 wherein a minor amount of an additional monomer is employed in step (a) or step (b) or both steps (a) and (b), said monomer being acrylonitrile, ethyl acrylate, alpha-methyl styrene, butyl acrylate, methacrylonitrile, or mixtures thereof.

8. A process according to claim 1 wherein the aqueous suspension includes a compound selected from the group consisting of ethylenediamine tetraacetic acid, methylene disaliclic acid, salicylic acid, citric acid, tartaric acid, ascorbic acid, phosphoric acid and partial alkali metal salts thereof containing at least one free carboxylic acid group per molecule.

9. A process according to claim 1 wherein the weight ratio of total monomers to total rubber solids in step (a) is in the range of 15/85 to 50/50.

10. A process for preparing a transparent graft polymer composition comprising:
    a. preparing a pregraft reaction product in emulsion and in the absence of added suspending agent by reacting a polybutadiene rubber latex having an average rubber particle size in the range of 0.01 to 0.8 micron with a first monomer mixture of styrene and methyl methacrylate having a weight ratio in the range of 5/95 to 80/20, the weight ratio of total monomers to total rubber solids being in the range of 5/95 to 60/40 under conditions such that essentially all of the monomer mixture is reacted, employing solely a water soluble emulsion polymerization catalyst in said preparation;
    b. forming an aqueous suspension of a second monomer mixture of styrene and methyl methacrylate, the emulsion of pregraft reaction product from step (a) and an oil soluble initiator, the amount of emulsion being sufficient to provide a total rubber content in the final graft polymer composition in the range of 3 to 60 percent by weight and the weight ratio of styyrene to methyl methacrylate in the second monomer mixture being such that the concentration of total styrene ($S_a$) basis the total amount of styrene and methyl methacrylate in the first and second monomer mixture is within the limits defined by the relationship wt%$S_a$ = 23.4±10.
    c. increasing the temperature of the suspension containing the emulsion of pregraft reaction product to an initial polymerization temperature in the range of 80°C to 150°C during which time the emulsion is substantially converted to a suspension;
    d. polymerizing the monomers in the presence of the pregraft reaction product in suspension at temperatures in the range of 80°C to 150°C; and
    e. recovering the graft polymer composition product in bead form directly from suspension.

* * * * *